United States Patent [19]
Siems

[11] 3,863,057
[45] Jan. 28, 1975

[54] APPARATUS FOR SERIALLY-CORRELATING TIME SERIES
[75] Inventor: Lee E. Siems, Houston, Tex.
[73] Assignee: Digital Data Systems, Inc., Houston, Tex.
[22] Filed: Jan. 17, 1972
[21] Appl. No.: 218,259

[52] U.S. Cl. .......... 235/152, 235/181, 340/15.5 DP
[51] Int. Cl. .................... G01v 1/36, G06f 15/34
[58] Field of Search .......... 235/152, 156, 164, 181, 235/168; 324/77 G, 77 V; 340/15.5 TA, 15.5 DP, 15.5 CC, 15.5 SC

[56] References Cited
UNITED STATES PATENTS
3,304,417  2/1967  Hertz ................................ 235/164
3,449,553  6/1969  Swan ............................. 235/152 X
3,489,888  1/1970  Wilhelm, Jr. et al. ............. 235/164
3,536,903  10/1970 Goshorn et al. .................... 235/168
3,671,931  6/1972  Loofbourrow .......... 340/15.5 DP X Primary Examiner—Joseph F. Ruggiero
Attorney, Agent, or Firm—Michael P. Breston

[57] ABSTRACT

An apparatus for serially-correlating two discrete time series wherein the data values of each element of the series are converted to floating-point numbers consisting of an algebraic sign, a mantissa, and an exponent to an arbitrary base. The exponents are adjusted to constrain the mantissas to fall within a narrow, substantially-constant, numerical range near unity. Variations of the exponents of the respective time series are thus representative of variations in the signal levels of the time series. The signs and exponents are then stripped from the mantissas and are serially correlated as if they were the actual data values.

5 Claims, 4 Drawing Figures

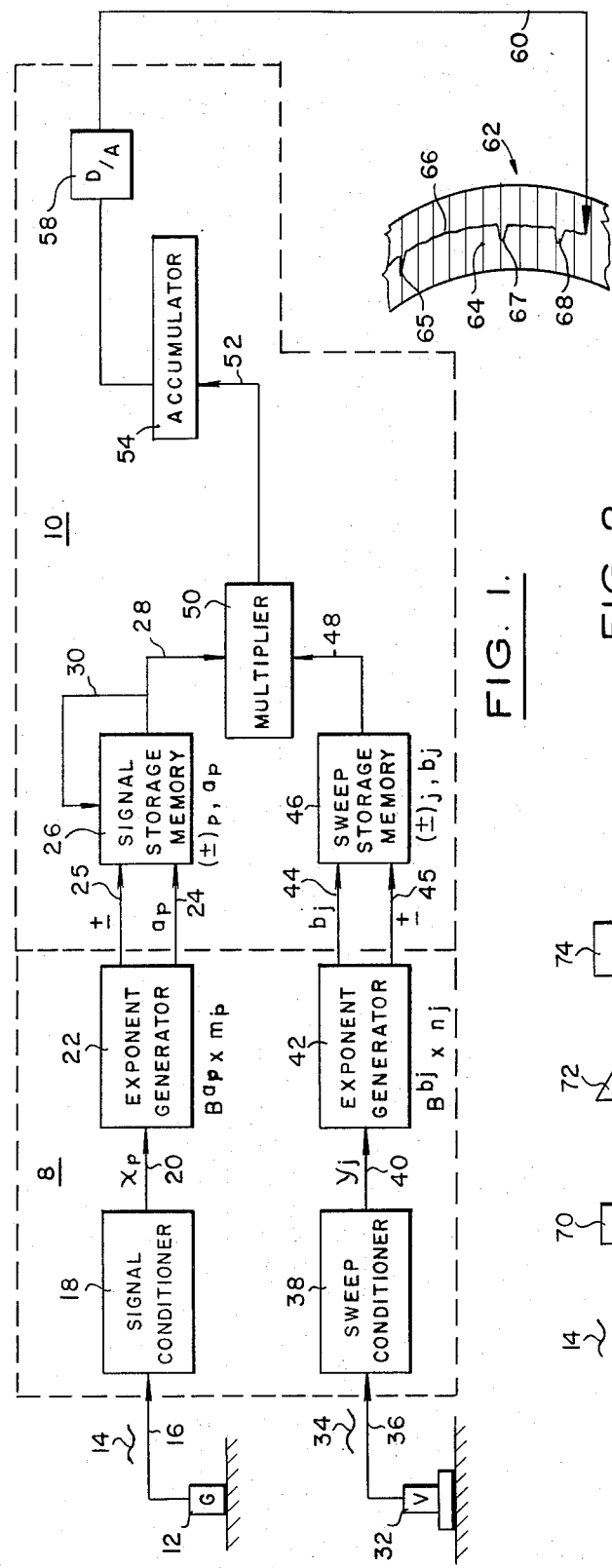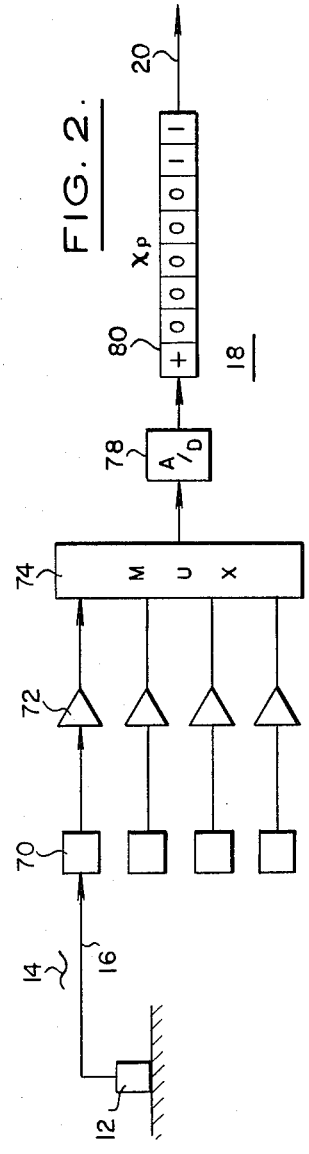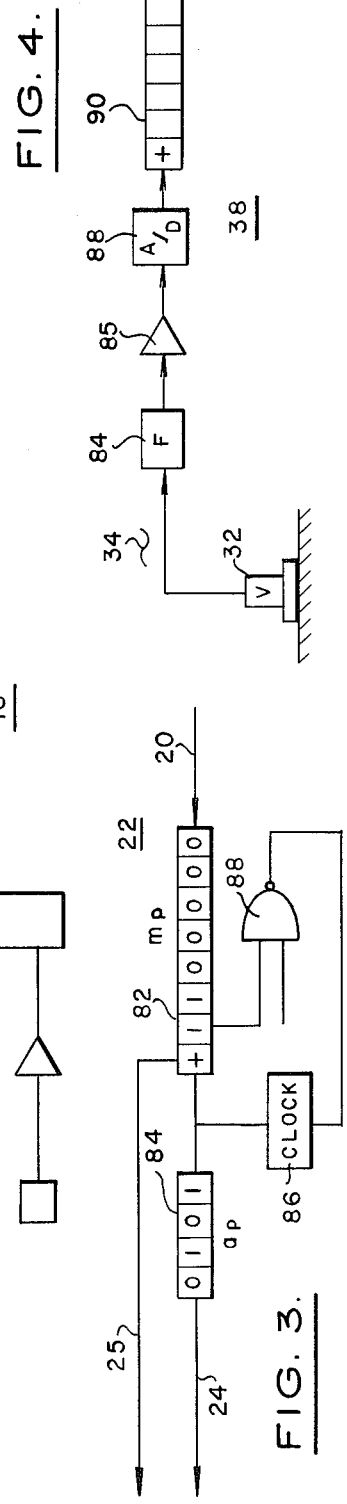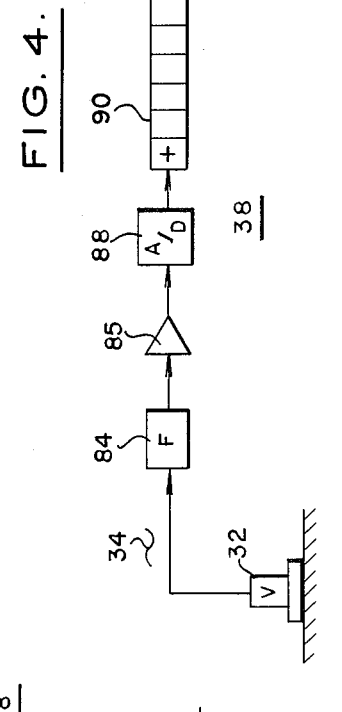

APPARATUS FOR SERIALLY-CORRELATING TIME SERIES

BACKGROUND OF THE INVENTION

In seismic exploration a seismic energy source transducer injects a seismic signal into the earth. The signal travels downwardly and becomes reflected from subsurface formations. The reflected signal returns to the surface of the earth where it is detected by sensitive geophones which convert the reflected seismic signals to electrical signals and transmit the signals to a signal utilization device. The travel time delay between the time of injection of the original seismic signal and the time of reception of the reflected signals by the geophones is a function of the depth of the respective formations. Typically a maximum reflection-time delay on the order of several seconds is expected while reflections from shallower formations will arrive proportionately sooner.

In one method of seismic exploration, the seismic energy source transducer produces a sweep signal. The sweep signal is a unique wave train that is non-repetitive during a period which is at least as long as the maximum travel-time delay. The sweep-signal wave-train will be reflected from several subsurface formations. Seismic signals received by the geophones will be a complex wave train containing successively overlapping images of the original sweep signal. The beginning of each of the overlapping images will be shifted in time from the instant of initiation of the sweep signal in proportion to the vertical depth of the formations.

Useful information from the complex, reflected wave-train is obtained by serially-correlating that wave-train with a replica of the original sweep signal. From the results of serial-correlation, a correlogram can be constructed. The time delays to successive correlogram peaks are functions of the depths of each reflector. Methods and apparatus for practicing this technique of seismic exploration are very well known to the art; see for example, U.S. Pat. No. 2,688,124.

In the field, it is essential that the geophysicist be able to make a preliminary interpretation of the seismic data while the seismic exploration is being conducted. Similarly it is important that the operating technician be able to monitor the functioning of the equipment. Inasmuch as the raw seismic data as recorded in the field canot be interpreted by simple inspection, a field correlator must be provided.

Seismic data are customarily expressed, recorded, and manipulated as binary numbers with a typical resolution of 15 bits plus a sign bit. A typical reflected time-series may have a 24-second duration and a 4-ms sample rate. Therefore, a conventional field correlator may require storage for 6,000 16-bit data samples for the reflected data. Memory for 3,000 16-bit samples may be needed to store the original 12-second sweep signal, and an additional 3,000 32-bit locations may be needed as buffer storage for the integrated cross-products. It is apparent therefore that a tremendous amount of bulk digital storage is needed to handle the correlation computations.

Large digital computers, such as are found in a central data-processing center, equipped with array processors can handle serial-correlation problems without difficulty. For a field correlator, however, the physical size of the required bulk storage, the expense of the hardware, and field time lost in making the computations requiring manipulation of 16 and 32-bit numbers render present state-of-the-art field correlators complicated, expensive, or very slow. Other prior-art field correlators use crude approximations, typically only 4 or 8 bits of the 16-bit seismic and sweep data-words, in order to reduce storage requirements. The resulting correlograms lack resolution.

Seismic data are recorded in the field as digital, floating-point, computer-compatible numbers on magnetic tape. Customarily, in computer operations, a floating-point number includes an algebraic sign, a positive exponent to a selected number base, and a mantissa. Before these numbers can be processed by conventional field correlators, it is necessary to normalize the floating-point numbers to absolute-value binary integers. The hardware needed for normalization is complicated and expensive; furthermore, field-correlator computation-time is necessarily increased.

There is a need therefore for a serial-correlation apparatus for field use that will be rapid and require only inexpensive, compact hardware. This need can be filled by reducing the size of the required data-storage capacity, simplifying the arithmetic, and eliminating the need for conversion of floating-point numbers to integers.

SUMMARY OF THE INVENTION

It is a broad aspect of the present invention to provide an apparatus for calculating an approximate value of the inner product of two vectors whose components values are expressed as floating point numbers wherein each number consists of a sign, and exponent, and a mantissa. The apparatus includes selecting means for selecting only the signs and exponents of the floating point numbers, and means coupled to the selecting means for using the signs and exponents without the mantissa values to calculate the approximate value of the inner product of the two vectors.

In another aspect of this invention, a continuous vibratory signal is sampled at preselected intervals and each sample is converted to a floating-point number consisting of a preselected pattern of bits. A floating-point number consists of an algebraic sign, a positive exponent to a predetermined base, and a mantissa. The positive exponent of the floating-point number is adjusted to cause the mantissa of each sample to lie within a narrow numerical range close to unity. As the signal varies, the mantissa remains substantially constant while the exponent varies to track the variations in signal amplitude. Hence, two time-series whose, elements are samples of a vibratory electrical signal, can be serially-correlated by using the exponents and algebraic signs as if they were the actual data values.

It is also an object of this invention to provide a fast acting Automatic Gain Control (AGC) that will hold the signal variations of two electrical vibratory wave trains within a substantially constant amplitude range. The two wave trains can be serially-correlated by correlating variations in the AGC level required to compress the signals to a substantially constant amplitude range.

It is an additional purpose of this invention to provide a field correlator that requires a minimal amount of digital storage.

BRIEF DESCRIPTION OF THE DRAWINGS

FIG. 1 is a block diagram of an apparatus used to produce a correlogram from the covariances of two time-series;

FIG. 2 shows details of the signal conditioner illustrated in FIG. 1;

FIG. 3 illustrates details of the exponent generator shown in FIG. 1; and FIG. 4 shows details of the sweep conditioner shown in FIG. 1.

DETAILED DESCRIPTION OF THE INVENTION

Serial-correlation of two time series may be better understood by a brief mathematical review. For example, let two continuous oscillatory electrical signals such as a reflected wave train and a sweep signal be sampled at preselected time intervals. Let the voltage level of each sample be converted to a digital number representative of the magnitude thereof and then tabulated as in Table 1 in an ordered array to form two discrete time-series having $l+k$ and $l$ elements, respectively. Typical elements $x_p$ and $y_j$ of the two series may be expressed as binary integers.

TABLE 1

| Reflected Signal | Sweep Signal |
|---|---|
| $x_1$ | $y_1$ |
| $x_2$ | $y_2$ |
| $x_3$ | $y_3$ |
| $x_4$ | . |
| $x_5$ | . |
| $x_6$ | $y_j$ |
| . | . |
| . | . |
| $x_j$ | $y_l$ |
| . | |
| . | |
| $x_p$ | |
| . | |
| . | |
| $x_{l+k}$ | | where $p=i+j$    ($i$ = phase lag, $j$ = running index)

The covariances $Z(k)$ are computed from:

$x_1 y_1 + x_2 y_2 + x_3 y_3 + ... + x_l y_l = Z(0)$    (1)
$x_2 y_1 + x_3 y_2 + x_4 y_3 + ... + x_{l+1} y_l = Z(1)$    (2)
$x_3 y_1 + x_4 y_2 + x_5 y_3 + ... + x_{l+2} y_l = Z(2)$    (3)

$x_k y_1 + x_{k+1} y_2 + x_{k+2} y_3 + ... + x_{l+k} y_l = Z(k)$, or in general:

$$\sum_{j=1}^{l} x_p \cdot y_j = Z(i) \quad (i = 0, 1, 2, ..., k) \quad (4)$$

A high numerical value of $Z(i)$ at the $i^{th}$ interval implies a high degree of association between the two time series at the time corresponding to the $i^{th}$ sample.

Running index $i$ may be defined as the phase lag between corresponding elements or data samples forming the two time series. If $i = 0$, there is no relative displacement between corresponding elements of the two series; if $i = 1$, there is a one-element relative displacement between the corresponding elements of the two time series. It follows that, assuming the original continuous signals to be sampled at 0.004-second intervals, if $i = 4$, the phase lag or displacement between the two series is 16 milliseconds or 4 sample intervals. Sampling of the two continuous oscillatory signals is commenced at the instant of initiation of the sweep signal. Hence $i$, multiplied by the sample-interval time, is the time elapsed since initiation of the sweep signal. A graph of $Z(i)$, plotted as a function of phase lag $i$ (i.e., as function of time), yields a correlogram, whose peaks may be, for example, indicative of the arrival times of reflected seismic wave trains.

Those skilled in the mathematical arts will recognize that the values of $Z(i)$ are the inner products (dot products) of the vectors $x_j$ ($j = i+1$ to $j = i+l$) and $y_j$ ($j = 1$ to $j = l$). Thus, the present invention may be used generally in all instances in which an inner product of vectors is required. The mathematics of serial correlation are discussed more fully in "Handbook of Probability and Statistics," Burlington and May Handbook Publishers Inc., Sandusky, Ohio, 1958.

Seismic data are recorded in the field on magnetic tape as digital floating-point numbers consisting of a sign, a mantissa, and an exponent of a preselected base. Binary-integer values for $x_p$ (where $p = i+j$) $y_j$ may be expressed in floating-point form as $$\pm x_p \equiv (\pm) B^{a_p} \times m_p,$$
$$\pm y_j \equiv (\pm) B^{b_j} \times n_j,$$

where $m_p$ and $n_j$ are mantissas having a value less than 1, B is a number-system base such as 2, 8, 16, or other base, and $a_p$ and $b_j$ are the exponents. Prior to recording on tape, the $m_p$ and $n_j$ were constrained to remain within a narrow numerical range close to unity. For all practical purposes $m_p$ and $n_j$ may be considered to be constants. So long as the mantissas remain relatively constant, variations in $x_p$ and $y_j$ will be closely represented by variations in $a_p$ and $b_j$ because the base does not change. The numerical values of the exponents are, in effect, measures of the level of an AGC; they are a measure of the compression applied to the input signals.

Thus the reflected wave train can be serially-correlated with the original sweep signal in accordance with equation (4), using the signs and exponents $a_p$ and $b_j$ in place of the actual data values $x_p$ and $y_j$.

The advantage of using exponents for correlation in place of actual data values is at least twofold. Seismic data-ranges are such that floating-point exponents can be expressed as binary numbers having a resolution of no more than 4 bits. Thus, the use of exponents cuts storage requirements by three-fourths as compared to conventional 16-bit fixed point data. Further, because the exponents have previously been recorded on magnetic tape, they can be readily played back and used directly by a correlator. There is no need to de-normalize the floating-point numbers to binary integer format before correlation as was done in the prior art.

Referring now to FIG. 1 there is displayed a circuit diagram of a preferred correlator 10 for practice of this invention. For simplicity, only a single geophone channel 12 is shown.

Geophone 12 senses seismic signals generated by a sweep generator 32. Analog seismic signals symbolically indicated by 14 are transmitted over a cable 16 to processor 8. Processor 8 includes signal conditioners 18 and 38, exponent generators 22 and 42. A correlator 10 is provided consisting of memories 26 and 46, multiplier 50, accumulator or integrator 54, and digital-to-analog converter 58. All of these components are well known to the electronic art and are commercially available from several U.S. manufacturers.

Signal conditioning device 18 is shown in greater detail in FIG. 2. It is to be understood, however, that a plurality of geophone channels may send signals to corresponding channels of signal conditioner 18, as shown in FIG. 2. Signal conditioner 18 includes electrical filters 70 and amplifiers 72. A multiplexer 74 samples each channel sequentially. A sample interval of 0.002 or 0.004 second is typical. Analog data from multiplexer 74 are then converted by analog-to-digital converter 78 to a binary number whose value is representative of the amplitude of the analog signal at the instant of sampling. Output from converter 78 is stored in register 80.

While an 8-bit binary register 80 is shown in the drawings, it will be understood that larger registers may be used in practice. The number in register 80 represents a sample-value x. This number is an absolute-value binary integer. In the given example it is + 0000011. The sample value $x$ is fed from signal conditioner 18 to an exponent generator 22 via line 20. Exponent generator 22 is shown schematically in more detail in FIG. 3.

Exponent generator 22 consists of a shift register 82, a 4-bit binary counter 84, a clock 86 and a gate 88. The number (in this case + 0000011) from register 80 is transferred to shift register 82 through input line 20. The bits representing the binary value of $x$ are then left-shifted in shift register 82 until a bit occupies the most significant digit position.

The shifted number is the mantissa $m$. Because a bit must always occupy the most significant data-point, the mantissa $m$, in this example, will always be constrained to lie within a substantially constant range greater than 1/2 and approaching unity.

Binary counter 84 counts the number of shifts required to place the most significant bit of $x$ in the most significant digit position of register 82. Clock 86 controls the data-shifting, one digit per shift until gate 88 senses a bit in the most significant digit position. The binary number in counter 84 is the exponent $a$. In FIG. 2, five shift operations are required. Accordingly, counter 84 contains the number 0101.

In the example of FIG. 2, base 2 was used. A base other than 2, such as 8 or 16 could also be used, in which case a unit shift would include 3 or 4 bit positions, respectively, instead of one bit-position as shown.

Returning now to FIG. 1, both the exponent a and its sign are transferred from the exponent generator 22 to the signal memory-storage 26 by way of lines 24 and 25. As successive, signed exponent values are fed into storage 26 they are assigned sequential locations in accordance with their position in the time-series representing the original analog signal.

In a similar manner, the original sweep signal 34, generated by sweep signal generator 32, is transmitted by line 36 to a signal conditioner 38 to form the $y_j$.

Signal conditioner 38 is illustrated in detail in FIG. 4. Sweep generator 32 sends a signal 34 to filter 84, amplifier 85 and analog-to-digital converter 88. Filters 84 and amplifier 85 have characteristics identical to filters 70 and amplifiers 72, so that the sweep signal is subject to the same processing as the reflected signals. Analog-to-digital converter 88 samples the sweep signal at the same sample rate as A/D converter 78 and transfers each digitized sample to register 90 to form the $y_j$.

For illustrative purposes, signal conditioner 38 is shown separately but it is apparent that the sweep data could equally well be multiplexed by multiplexer 74 in signal conditioner 18 if desired. Similarly, A/D converter 78 and register 80 could be time-shared.

The $y_j$ are transferred over line 40 to exponent generator 42 where the signed sweep exponents $b_j$ are generated and transmitted by line 44 to sweep storage 46. Exponent generator 42 is similar to its equivalent, exponent generator 22. The $b_j$ occupy positions in storage 46 in accordance with their position in the sweep time-series.

After both signal storage 26 and sweep storage 46 have been filled with the $a_p$ and $b_j$ respectively, the first signed signal exponent $a_p$ and the first signed sweep exponent $b_j$ are transferred to multiplier 50 over lines 28 and 48. After multiplication of the two exponents, the product is transferred to accumulator 54 over line 52. The steps of multiplication and accumulation or integrating are repeated until all of the $a_p$ and $b_j$ have been multiplied together and their products summed in accumulator 54 thus computing a first covariance $Z(0)$. $Z(0)$ may be converted from a digital number to an analog voltage and recorded on an oscillogram 62.

Following computation of $Z(0)$, the $a_p$ in signal storage 26 are shifted one time interval. The time-shifted $a_p$ are now cross-multiplied with the unshifted $b_j$ in multiplier 50 and the sum of the new products accumulated in accumulator 54 to compute the covariance $Z(1)$ which is then converted to an analog voltage for recording on oscillogram 62 as a second point. The contents of signal storage 26 are again shifted one place and cross-multiplied by the unshifted $b_j$ to form a third covariance value $Z(2)$, which is converted to an analog voltage and recorded on oscilogram 62 as a third point. The process of cross-multiplication, integration, conversion to an analog voltage, recording, and shifting is repeated k times.

Upon completion of the serial-correlation, a correlogram 62 results. Timing lines 64 mark equal time intervals such as 0.050 second. The sweep initiation instant is recorded as a sharp peak 65 on the oscillogram trace 66 by circuitry not shown. The elapsed times between peak 65 and correlogram peaks 67 and 68, are the reflection delay times to two respective formations.

Correlation of a single seismogram may require nearly half a million multiply-add operations and the electronics forming this correlator have cycle times in the microsecond range. In a typical field operation such correlograms must be produced at intervals of 3 to 5 minutes. Hence, mechanical or manual implementations of the required serial-correlation process would be virtually impossible.

While this invention has been discussed with specific reference to seismographic exploration, it should be apparent that this invention may be applied whenever serial-correlation of discrete time series is required.

What is claimed is:

1. A device for calculating the approximate value of the inner product of two vectors whose component values are expressed as floating-point numbers wherein each number consists of a sign, an exponent, and a mantissa comprising:

means for setting the mantissas of said component values substantially equal to one;

exponent generator means for associating with each exponent its corresponding sign to form two vectors of the signed exponents;

correlator means to form the inner product of said vectors of signed exponents; and coupling means interconnecting said exponent generator means with said correlator means.

2. A device for calculating an approximate value of the inner product of two vectors whose component values are expressed as floating-point numbers, wherein each number consists of a sign, an exponent, and a mantissa, said device comprising:

means for separating the signs and exponents from the mantissas to form two derived vectors consisting of only the signed exponents of said component values; and correlator means coupled to said separating means for calculating the inner product of said derived vectors.

3. A compact digital apparatus for approximately correlating two time series of digital quantities expressed as floating-point numbers comprising:

means for removing the signed exponents from the floating-point numbers of said two time series; and correlator means coupled to said removing means for using said signed exponents to correlate said two time series, said correlator means including a multiplier means for multiplying said signed exponents in pairs, one of said pairs of signed exponents being selected from one time series, and the other of said pairs of signed exponents being selected from the other time series.

4. The apparatus of claim 3 wherein, said correlator means includes an adder coupled to said multiplier means to algebraically add the products of multiplication of said pairs of signed exponents.

5. An apparatus for calculating the inner product of two vectors whose component values are expressed as floating point numbers wherein each number consists of a sign, an exponent, and a mantissa, comprising:

means for selecting only the signs and exponents of said floating point numbers; and means coupled to said selecting means for using the signs and exponents without the mantissa values to calculate the inner product of said two vectors.

* * * * *